May 21, 1968 J. C. CUMMING 3,384,423
BRAKE SYSTEMS
Filed Dec. 30, 1966 2 Sheets-Sheet 2
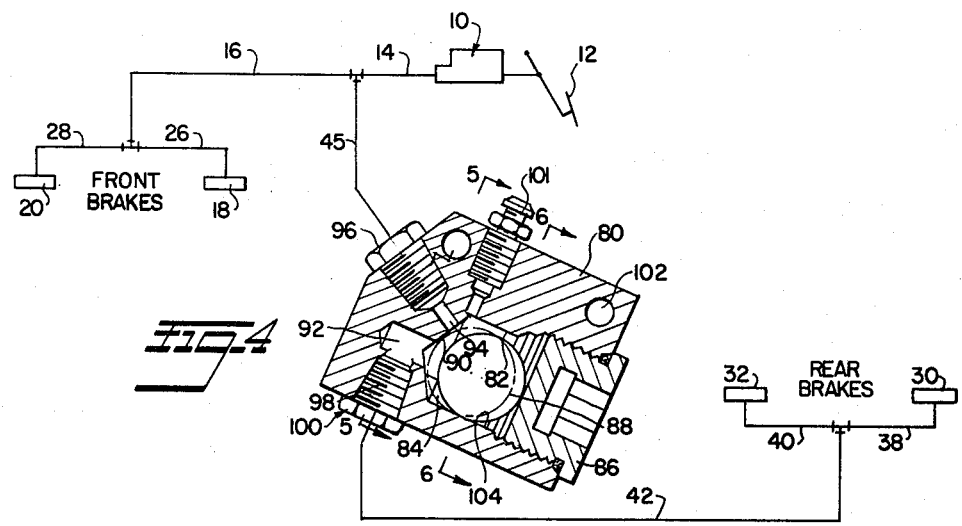
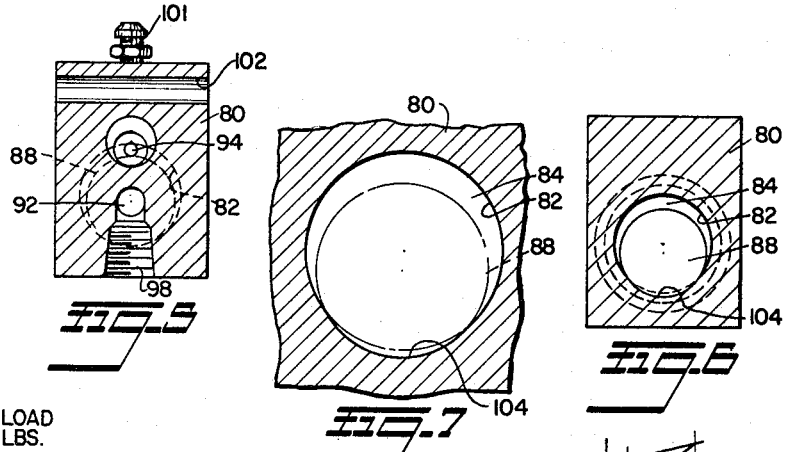
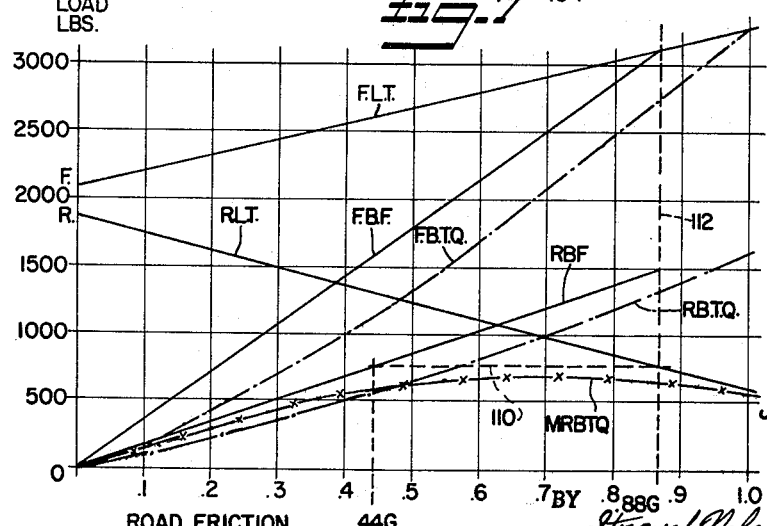
INVENTOR
James C. Cumming 3,384,423
BRAKE SYSTEMS
James C. Cumming, Pleasant Ridge, Mich., assignor to Rockwell-Standard Corporation, Pittsburgh, Pa., a corporation of Delaware
Continuation-in-part of applications Ser. No. 477,654, July 29, 1965, and Ser. No. 580,490, Sept. 19, 1966. This application Dec. 30, 1966, Ser. No. 606,360
5 Claims. (Cl. 303—24)

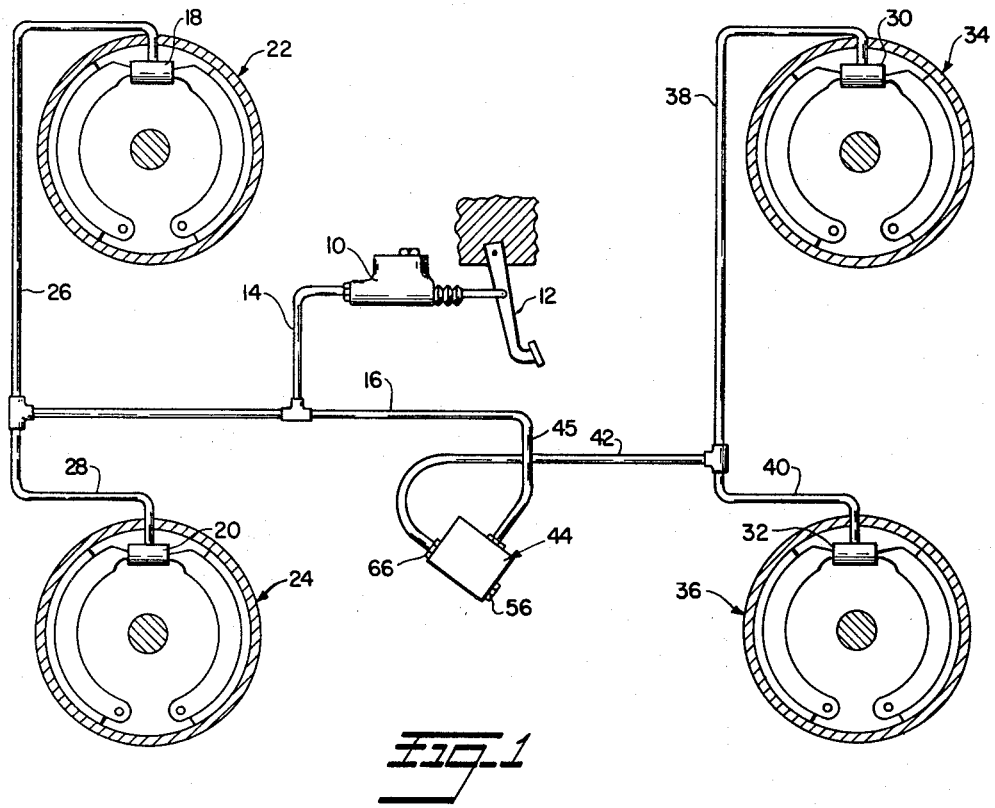
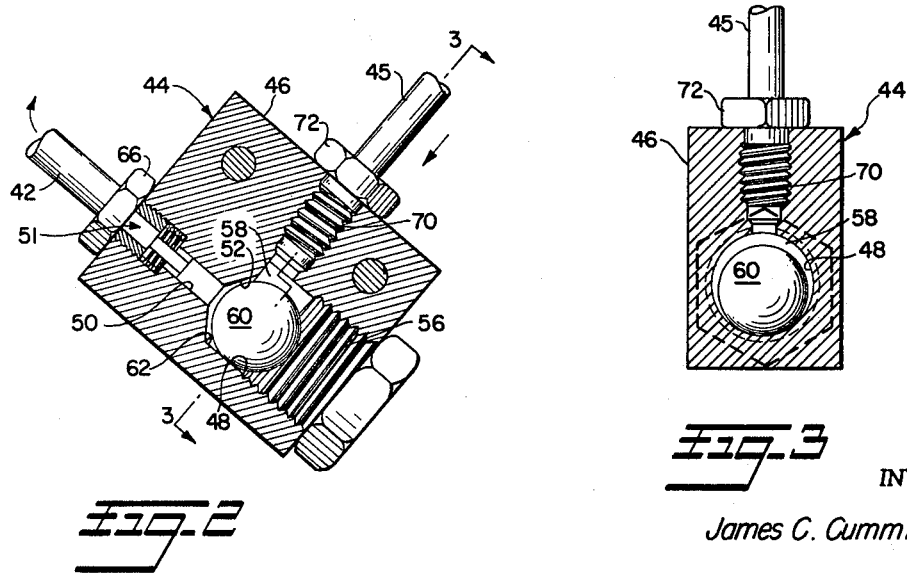

ABSTRACT OF THE DISCLOSURE

A vehicle braking system which includes an inertia responsive ball valve mounted in the vehicle at an angular position between the brake control and one pair of wheel brakes having an inlet and an outlet connected by a valve chamber which contains a ball adapted to close said outlet by its own inertia at a predetermined rate of deceleration to thus interrupt communication between said brake control and said pair of wheel brakes.

---

This application is a continuation-in-part of application Ser. No. 477,654 filed July 29, 1965 now Patent No. 3,297,368 as a continuation-in-part of application Ser. No. 429,082 filed Jan. 29, 1965, now abandoned. It is also a continuation-in-part of application Ser. No. 580,490, filed Sept. 19, 1966 as a division of said Ser. No. 477,654, now Patent No. 3,297,368.

The present invention refers to vehicle brake systems and more particularly to a brake force proportioning valve device for such systems.

In the operation of vehicle braking systems, the set of wheel brakes at the axle having the lightest static axle load tends to be locked-up before full braking is obtained at the other set of wheel brakes, thus causing the wheels to skid with resulting adverse effects on the controllability of the vehicles.

This effect, caused by the uneven load distribution on the axles of the vehicle, is augmented by the load transfer which takes place during braking of the vehicle which shifts part of the weight of the vehicle at the rear axle to the front axle due to the moment of inertia. The amount of load transfer is in direct proportion to the rate of deceleration.

Customarily, the variations in static load on the wheels of a vehicle are taken into account by providing different size wheel brake cylinders at the front and rear wheels. In a front engine passenger car, for instance, the front wheel cylinders are usually larger than the rear wheel cylinders to compensate for the greater weight on the front axle whereas in trucks or other commercial vehicles the rear wheel cylinders usually are larger than the front wheel cylinders because of the larger rear axle loads in these vehicles.

However, these variations in wheel cylinder sizes do not compensate fully for the load shift during brake application and for this reason various devices have been designed in the past to automatically proportion the braking force between the front and rear wheel brakes, including ball check valves of various designs.

For vehicles which are subject to relatively large and repeated load changes such as trucks and buses these devices may be coupled with a load change responsive means as for instance disclosed in the aforementioned copending application Ser. No. 477,654 for a more effective operation of the device. However, in light vehicles which undergo only nominal load changes such as passenger cars, jeeps, station wagons and so on load responsive means are not necessary but instead it is preferred to mount the braking force proportioning device stationary at a designated location in the vehicle, as will be more fully brought out in the detailed description following hereafter.

The primary object of the present invention resides in the provision of an improved brake force proportioning device for the brake system of a motor vehicle which is always effective to cut off fluid pressure to the set of wheel brakes at the lightest loaded axle just prior to locking the brakes.

Another object of the present invention is to provide an improved inertia type brake force proportioning valve for a vehicle braking system in which a ball member contained in the valve comprises the sole means of closing or opening of the valve.

It is a further object of the invention to provide an improved proportioning valve which includes a ball adapted to close in response to inertia forces, a seat between an inlet from a master cylinder and outlet leading to a set of wheel brakes, the inlet, outlet and seat being so related as to eliminate the influence of hydrodynamic lift forces on the ball.

Still another object resides in the provision of an improved brake system for motor vehicles including an inertia responsive brake force proportioning valve adapted to be operable upon deceleration of the vehicle to isolate the wheel brakes at one axle from the master cylinder at a point at which the normal theoretical brake torque at that axle would exceed the maximum theoretical non-slip torque.

A further object of the present invention is the provision of an improved inertia type brake force proportioning valve stationarily mounted in a vehicle and at such a location as to offset or neutralize the jounce and rebound of the vehicle during normal travel.

A still further object of the present invention resides in the provision of an improved inertia responsive ball valve for a vehicle brake force proportioning system having a cylindrical chamber normally adapted to establish fluid communication between an inlet and an outlet connected to said chamber, said chamber being provided with an axial groove to support and position a ball contained in said chamber.

Other objects and novel features will become more clearly apparent from the following detailed description having reference to the attached drawings in which:

FIGURE 1 is a schematic illustration of a vehicle braking system embodying the present invention;

FIGURE 2 is an enlarged section through one embodiment of the inertia valve;

FIGURE 3 is a section taken along line 3—3 of FIGURE 2;

FIGURE 4 is a central section through a preferred embodiment of the present novel proportioning valve;

FIGURES 5 and 6 are transverse sections taken along line 5—5 and 6—6, respectively, of FIGURE 4;

FIGURE 7 is an enlarged cross section of the ball chamber of the valve in FIGURE 4; and FIGURE 8 is a graph illustrating the relationship between load transfer, braking force and brake torque plotted against the road friction coefficient.

With reference to FIGURE 1 there is shown a vehicle braking system illustrated schematically and which includes a master cylinder 10 adapted to be operated by the usual brake pedal 12. A conduit 14 leads from the pressure side of the master cylinder to a main conduit 16 which is connected directly to the wheel cylinders 18 and 20 of the front wheel brakes 22 and 24 through conduits 26 and 28. The wheel cylinders 30 and 32 of the rear wheel brakes 34 and 36 are connected by conduits 38 and 40, respectively, to a branch conduit 42 which is in communication with the outlet side of the novel brake force proportioning valve 44, the inlet side of which is connected by a conduit 45 to conduit 16.

The wheel brakes 22, 24 and 34, 36 may be of any known construction and are here schematically illustrated as being of the anchored Lockheed type, it being understood that the present invention is not limited to a certain type of brake.

With further reference to FIGURES 2 and 3, the novel proportioning valve 44 which is adapted to control the braking force at the wheel brakes with which it is associated, in this instance the rear wheel brakes, is basically an inertia valve which functions under certain conditions in the movement of the vehicle, such as deceleration during braking without having to overcome any internal resistance such as springs, etc.

The valve 44 in this embodiment comprises a valve body 46 bored longitudinally to provide eccentric stepped bores 48 and 50. The larger bore 48 extends approximately to the center of the valve body where it connects to the smaller bore 50 providing a chamfered valve seat 52. The bore 48 constitutes a chamber 58 adapted to receive a metal ball 60 of smaller diameter than the chamber 58, the ball being freely movable between the seat 52 and the inner end of a closure plug 56. Normally, the ball 60 rests on the lower surface 62 of the chamber 58 against the plug 56 when the valve is properly installed as shown in FIGURE 2 and in this position the axis of the ball is on the centerline of the small bore 50 and the axis of the chamber 58 is on a common vertical plane parallel with the axis of the small bore 50 and the longitudinal axis of the vehicle.

As illustrated in FIGURE 1 the valve 44 will be preferably installed in the vehicle with the axis of the chamber 58 at an angle α with the horizontal and at a midpoint of the vehicle between the front and rear wheels to neutralize the frame lifting effect when the vehicle goes over a bump. The plug 56 faces the rear of the vehicle so that the ball 60 initially sits in the rear of the chamber 58 against the inner end of the plug. The lower chamber surface 62 upon which the ball rests is thus inclined and normally prevents the ball from moving against the valve seat 52. However, when the moving vehicle is braked, the ball 60 will, at a certain rate of deceleration, travel up the incline and close against the valve seat 52 due to the force of inertia. It will be noted that the distance the ball 60 travels from the end of the plug to the valve seat is very short to assure quick action of the valve and to reduce rolling friction to a minimum.

The small diameter bore 50 provides an outlet passage and is threaded at its outer end to receive a fitting 66 which connects to the branch conduit 42 leading to the wheel cylinders 30 and 32 of the rear brakes 34 and 36.

Communication between the valve chamber 58 and the master cylinder 10 in this instance is provided by an inlet bore 70 leading into the valve chamber 58 opposite the surface 62 and which is threaded to receive a fitting 72 connected to conduit 45 and thus to main conduit 16. As will be seen, the axis of the inlet 70 intersects the chamber 58 at a point between the valve seat 52 and the center of the ball 60 so that fluid flows from the inlet 70 through chamber 58 past the ball 60 and in front thereof to the outlet 50.

Thus, in the normal inclined position of the valve 44, that is, with the ball 60 resting against the inner end of the plug 56 as in FIGURE 2 the master cylinder 10 is in free fluid communication with the rear wheel brakes. However, under certain braking conditions this communication will be interrupted when the ball 60 becomes lodged against the valve seat 52, thus preventing any further flow of fluid pressure from the master cylinder to the rear wheel cylinders.

In operation, the operator applies the brakes in the usual manner by depressing foot pedal 12 thereby developing pressure on the fluid in the master cylinder 10 which is transferred through the main conduit 16 to the front brakes 22 and 24 and via the valve 44 which is open to the rear brakes 34 and 36. When a certain rate of deceleration is reached, which is dependent on the load on the rear axle and the rate of load transfer, the ball 60 rides up the inclined surface 62 due to its inertia and closes the outlet 51 by seating against the valve seat 52 thus preventing further application of additional braking force to the rear wheel brakes. Thereafter, continued pressure through the inlet 70 behind the ball 60 holds the ball 60 firmly against the valve seat. The valve 44 will close preferably just short of the point at which the rear brakes would lock.

Upon release of brake pedal 12 the reduction of pressure at the inlet port 70 together with the force of the usual return springs at the rear brakes causes fluid flow in reverse direction and immediately moves the ball 60 away from the valve seat 52 to open communication between the ports 51 and 70 through chamber 58.

The initial inclination of the valve 44 which determines the point of valve closing can be exactly determined by calculating the load shift ratio at a given load on the front and rear axle in relation to the braking force and brake torque of the brake system from 0.0 $g$ (start of deceleration) to 1.0 $g$ (maximum).

The load shift ratio between front and rear axles is determined by dividing the center of gravity (in inches) by the wheel base (in inches) and multiplying the result by the total load on both axles and the road to tire friction coefficient. The resultant amount is the amount of load shifted from the rear axle to the front axle during the deceleration. In other words, this amount is added to the front axle and deducted from the rear axle. It is the purpose of the system of the present invention to limit the braking force at the rear brakes in advance of locking of the rear brakes and subsequent skidding of the vehicle. This is accomplished by preferably limiting the braking force to the rear brakes to a value just below that at which the brakes would lock as continuing load transfer takes place caused by deceleration of the vehicle.

The angle α of inclination of the valve 44 to assure closing of the valve at the desired rate of deceleration was found by assuming the calculated rate of deceleration for closing—for instance .28 $g$—to be the tangent of the angle α of inclination. This angle is then 15.6°. By mounting the valve 44 at exactly this angle to the horizontal the valve functioned to close at the calculated rate of deceleration.

Although the valve in the FIGURES 1 to 3 embodiment normally functions as intended it was found that under certain circumstances during braking, especially under panic stop conditions, the suddent increase in fluid pressure through inlet 70 past the ball 60 through the relatively narrow space between the ball and the valve seat 52 produced a hydro-dynamic lift effect on the ball which caused the ball to be moved forward against the valve seat 62 and thus prematurely closing the valve with the effect that not enough braking force will be available at the brakes controlled by the valve.

For this reason, the valve embodiment illustrated in FIGURES 4 to 7 will be preferred which differs from the valve in FIGURES 1 to 3 by the changed position of the inlet port in such way as to eliminate any adverse hydro-dynamic lift effect on the ball.

As in the previously described embodiment, the preferred valve comprises a housing 80 having a cylindrical bore 82 forming a valve chamber 84, the outer end of which is closed by a plug 86. A steel ball 88, having a diameter appreciably less than the diameter of the chamber 84, is freely movable in the chamber between the inner end of the plug 86 and the inner end of the bore 82 which is beveled to form a valve seat 90 surrounding the inner end of an outlet passage 92 which connects to the conduit 42 leading to the rear wheel cylinders 30, 32.

It will be noted that here likewise the axis of the chamber 84 and outlet 92 are parallel to each other and lie in a common vertical plane but the axis of the outlet 92 is offset beneath the axis of the chamber 84 to intersect the center of the ball 88.

The outer end of an inlet passage 94 is threaded to receive a suitable fitting 96 for connection to the line 45 coming from the master cylinder. The outlet passage 92 is in communication with a bore 98 threaded for the reception of the fitting 100 for connection to line 42 leading to the rear wheel brakes. The valve assembly also includes a bleeder valve 101 to permit the bleeding of air trapped in the chamber 84 at the time of installation. The housing is also provided with attaching holes 102.

As best shown in FIGURE 7 the bottom of the chamber 84 is milled out to form a track 104 which has the same radius as the radius of the ball 88. The track 104 provides a linear guide for the ball to prevent undesired lateral movement of the ball within the chamber 84.

It will be noted that the inlet passage 94 lies in a common vertical plane with the outlet 92 and chamber 84 but is so positioned that entering fluid will be directed substantially at the center of the ball in a direction downwardly and rearwardly to keep the ball against the inner end of the plug 86 by creating a high pressure area in front of the ball and a low pressure area behind the ball when fluid pressure is applied. This construction eliminates all tendency of the ball to move prematurely towards the valve seat due to the hydro-dynamic lift effect obtained under the aforesaid circumstances with the valve of FIGURES 1 to 3.

The installation and operation of the preferred valve of FIGURES 4 to 7 is essentially the same as that described above in connection with the embodiment of FIGURES 1, 2 and 3. The valve is installed at a calculated angle which may be in the neighborhood of 12 to 25° so that when the system is at rest the ball 88 is positioned in the track 104 and rests against the inner end of the plug. During initial brake application, the ball remains in the illustrated position and free communication between the inlet passage 94 and the outlet passage 92, 98 permits application of all wheel brakes in the usual manner. During initial brake application the position of the ball 88 is stabilized by the incoming flow of fluid pressure issuing from the inlet opening 94. However, at a calculated rate of vehicle deceleration the ball 88, due to its inertia, rolls up the track 104 and sealingly engages the valve seat 90 around the outlet passage 92 to isolate the rear brakes from the master cylinder. The position of the inlet passage 94 in relation to the chamber 84 and the ball 88 is such that increased fluid pressure does not substantially influence the position of the ball, that is, it does not prevent movement of the ball nor cause the unseating of the ball after it has closed the outlet port.

In conventional braking systems without the present novel inertia valve arrangement a substantially uniform braking effort is being produced at the front and rear wheel brakes up to where the resultant load shift from the rear to the front unloads the rear axle to such extent that the brake applying pressure for the rear wheel brakes becomes too excessive with consequent brake lock-up although the front wheel brakes may produce a still greater braking effort due to the increased load. By applicants novel device the rear wheel brakes will be completely isolated from the pressure applying master cylinder just short of a point below that where the rate of unloading exceeds the brake applying pressure and thereafter holding the pressure constant until the vehicle comes to a stop, at the same time allowing increased pressure being applied to the front wheel brakes without affecting the rear wheel brakes.

With particular reference to FIGURE 8 the load transfer, braking forces and required brake torque curves of a particular vehicle have been plotted against the friction coefficient of the friction force between the road and tires from zero to 1.0 (K).

The amount of load transfer from the rear to the front which takes place during braking of the vehicle can be determined by the equation:

$$\frac{CG}{WB} \times T_L \times K$$

in which $CG$=height of the center of gravity of the vehicle, $WB$=the wheel base in inches, $T_L$=the sum of the load on both axles and $K$=the road to tire friction coefficient. The resultant is the amount of load gradually transferred from the rear to the front. In other words, this amount of load will be added to the load on the front axle and deducted from the load on the rear axle. In a graph this load transfer can be expressed in straight lines and, as illustrated in FIGURE 4, solid line F.L.T. represents the load transfer for the front axle and solid line R.L.T. represents the load transfer for the rear axle whereby the left hand vertical indicates the original static or curb loads on the axles. The designed braking force for the axles is likewise linear and is in the graph represented by the solid lines F.B.F. for the front axle and R.B.F. for the rear axle. Where the brake force line F.B.F. for the front axle intersects the load transfer line F.L.T. (in this instance at .88 G) maximum line pressure is indicated which is sufficient to bring the vehicle to a stop. However, as will be observed the brake force line R.B.F. for the rear axle intersects the rear axle load transfer line R.L.T. at a much earlier point, for instance at about .63 G, whereafter further brake force required for the front wheel brakes as indicated by the lines F.B.F. and R.B.F. causes the rear wheel brakes to lock-up and thus the rear wheels to skid prior to the vehicle coming to a stop. By drawing a straight horizontal line 110 from where the load transfer line R.L.T. of the rear brakes crosses the maximum brake force line 112 to the brake force line R.B.F. we arrive at a G-value of about .44 G somewhere around which the brake force applying pressure (line R.B.F.) for the rear brakes should be modified to the extent that the brake force line can be projected without crossing the load transfer line to prevent locking of the brakes.

This is accomplished in the present invention by projection upon the graph in FIGURE 4 the respective normal maximum brake torque curves F.B.TQ. for the front brakes and R.B.TQ. for the rear brakes in conformity with the conventional brake force calculations represented in the graph and which would be obtained without the use of the present novel device. It will be seen that the front brake torque curve substantially parallels the front brake force line, however, extending beyond the maximum brake force line 112 to intersect the load transfer line F.L.T. at 1.0. The normal maximum rear brake torque curve R.B.TQ. likewise would substantially parallel the rear brake force line R.B.F. However, due to the load transfer which takes place it is desirable to hold the brake force pressure to the rear brakes and thus the obtainable rear brake torque substantially constant from a point prior to where the brake force and maximum brake torque lines cross the load transfer line R.L.T. Thus, a curve for the calculated *ideal* maximum rear brake torque for non-skid is indicated on the graph at M.R.B.TQ. and with the use of the present novel device the Maximum Rear Brake Torque curve for non-skid should level off to a substantially constant value from a point where this curve crosses the maximum theoretical rear brake torque curve R.B.TQ. which, as can be seen, coincides with the previously established ideal point at which the brake force R.B.F. should be modified to prevent skidding of the rear wheels, that is, at a rate of deceleration of around .44 G.

This established point, of course, will vary with the type of vehicle and its specific height of the center of gravity which determines the amount and rate of load transfer, but in any instance this brake pressure modifying point can be exactly determined by the process of graphic calculation as above described.

Remaining with the example herein presented as applied to a particular vehicle to cause the novel inertia responsive valve 80 to function at the calculated rate of deceleration (that is .44 G) to make the ball 88 roll up the incline to close the outlet 92 the valve must be installed in the vehicle at a precise angularity in relation to the horizontal centerline of the vehicle which can be exactly determined. By presuming the calculated rate of deceleration to be the tangent of an angle the valve 80 will be set at an angle corresponding to that tangent which in the present instances would be at about 25°, the angle of the tangent .44.

With the valve set at that angle as illustrated in FIGURE 4 the ball 88 is normally positioned towards the rear of the valve against the plug 86 due to gravity and residual fluid pressure in the system providing free fluid communication between the inlet port 94 and outlet port 92. During initial brake application the ball retains its illustrated position allowing the rear wheels brakes to be applied. However, as the vehicle slows down further upon increased brake pressure and the rate of deceleration reaches .44 G the ball 88 is forced by inertia to roll up the track 104 towards the valve seat 90 and closes the outlet port as indicated by the broken line position of the ball to isolate the rear wheel brakes 30 and 32 from the master cylinder 10. The position of the inlet port 94 in relation to the chamber 84 and ball 88 is such that increased fluid pressure under fluid flow conditions through that port upon brake application does not prevent movement of the ball nor cause unseating of the ball after it has closed the outlet port 56 so that further increased brake pressure will only be applied to the front wheel brakes.

From the foregoing it will be seen that the present novel pressure modifying inertia responsive valve in the present novel system functions at a preselected rate of deceleration to isolate the wheel brakes on the unloading axle from the master cylinder to prevent further increased brake applying pressure thereto in order to prevent those brakes from locking-up.

It will be appreciated that in the present pressure control valve no internal resistances have to be overcome by the ball during its movement as in known devices which rely on additional poppet valves for fluid communication, the operation of which is controlled by the ball. In the present invention the ball constitutes the sole means to control the fluid communication through the valve. Furthermore, rolling friction is reduced to a minimum due to the exceedingly short travel of the ball assuring fast reaction and less wear.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. For use in a vehicle braking system having an operator controlled fluid pressure source, conduits connecting said source with a set of front wheel brakes and a set of rear wheel brakes: a valve assembly adapted for installation in a conduit between said source and one set of wheel brakes, said valve assembly comprising a housing means forming an essentially cylindrical valve chamber in said housing having a valve seat at one end, a first passage extending through said valve seat connecting said valve chamber with said one set of wheel brakes, the axis of the end of said first passage at said valve seat being parallel to but below the axis of said valve chamber, a free moving valve element within said valve chamber, said valve element being movable toward and away from said valve seat to selectively interrupt communication between said chamber and said first passage, means forming an upwardly facing track groove opening into the lowermost portion of said chamber for guiding said valve element in its movement, said track groove being formed concentrically with said end of said first passage whereby said ball moves into engagement with said valve seat in straight line motion, and a second passage in said housing providing a fluid connection between said source and said chamber and extending into said one end of said chamber adjacent said seat, said passage being so positioned with respect to the axis of said chamber as to direct incoming fluid against said valve element, said valve assembly being adapted for mounting in a vehicle in an inclined position with the axis of said valve chamber extending rearwardly and downwardly away from said valve seat so that said free moving valve element is normally gravity urged away from said valve seat to allow unrestricted fluid communication from said second passage through said valve chamber into said first passage, said free moving valve element being urged against said valve seat to interrupt said communication upon a predetermined rate of deceleration of said vehicle.

2. The combination according to claim 1 wherein said free moving valve element is a ball having a diameter considerably smaller than the diameter of said cylindrical valve chamber.

3. The combination according to claim 2 wherein said track groove is formed on the same radius as the radius of said ball.

4. The combination according to claim 1 wherein said second passage is so inclined as to direct incoming fluid away from said seat.

5. For use in a vehicle braking system having an operator controlled fluid pressure source, conduits connecting said source with a set of front wheel brakes and a set of rear wheel brakes: a valve assembly adapted for installation in a conduit between said source and one set of wheel brakes, said valve assembly comprising a housing, means forming an essentially cylindrical valve chamber in said housing having a valve seat at one end, a first passage extending through said valve seat connecting said valve chamber with said one set of wheel brakes, the axis of the end of said first passage at said valve seat being parallel to but below the axis of said valve chamber, a free moving ball valve element within said valve chamber, the diameter of said ball being substantially less than the diameter of said chamber, said ball being movable toward and away from said valve seat to selectively interrupt communication between said chamber and said first passage, the lowermost portion of said chamber providing a surface for guiding said ball in its movement, said surface being formed to dispose the center of said ball below said axis of said chamber and in alignment with the axis of said end of said first passage whereby said ball moves into engagement with said valve seat in straight line motion, and a second passage in said housing providing a fluid connection between said source and said chamber and extending into said one end of said chamber adjacent said seat, said passage being so positioned with respect to the axis of said chamber as to direct incoming fluid against said valve element, said valve assembly being adapted for mounting in a vehicle in an inclined position with the axis of said valve chamber extending rearwardly and downwardly away from said valve seat so that said free moving ball is normally gravity urged away from said valve seat to allow unrestricted fluid communication from said second passage through said valve chamber into said first passage, said free moving ball being urged against said valve seat to interrupt said communication upon a predetermined rate of deceleration of said vehicle.

References Cited

UNITED STATES PATENTS

| | | | |
|---|---|---|---|
| 2,218,194 | 10/1940 | Freeman | 188—152 |
| 3,087,761 | 4/1963 | Stelzer | 303—24 |
| 3,143,379 | 8/1964 | Eksergian | 303—24 |

OTHER REFERENCES

Automobile Engineer, October 1964, pp. 455–456.

MILTON BUCHLER, *Primary Examiner.*

J. J. McLAUGHLIN, *Assistant Examiner.*